US012591817B2

(12) United States Patent
Lal et al.

(10) Patent No.: US 12,591,817 B2
(45) Date of Patent: Mar. 31, 2026

(54) GENERATING RULE LISTS FROM TREE ENSEMBLE MODELS

(71) Applicant: Microsoft Technology Licensing, LLC, Redmond, WA (US)

(72) Inventors: Gopiram Roshan Lal, Madison, WI (US); Varun Mithal, Sunnyvale, CA (US); Xiaotong Chen, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 890 days.

(21) Appl. No.: 17/894,629

(22) Filed: Aug. 24, 2022

(65) Prior Publication Data

US 2024/0070549 A1    Feb. 29, 2024

(51) Int. Cl.
*G06N 20/00* (2019.01)
*G06N 5/025* (2023.01)
*G06N 20/20* (2019.01)

(52) U.S. Cl.
CPC ............. *G06N 20/20* (2019.01); *G06N 5/025* (2013.01)

(58) Field of Classification Search
CPC ......... G06N 20/00; G06N 20/20; G06N 5/025
See application file for complete search history.

(56) References Cited

U.S. PATENT DOCUMENTS

| | | | | |
|---|---|---|---|---|
| 7,386,835 | B1 * | 6/2008 | Desai | ..................... G06F 9/451 |
| | | | | 717/107 |
| 2016/0162787 | A1 * | 6/2016 | Kumaran | ................ G06F 16/25 |
| | | | | 706/47 |
| 2020/0320619 | A1 * | 10/2020 | Motaharian | ........ G06Q 30/0185 |
| 2020/0334580 | A1 * | 10/2020 | Sheopuri | ................ G06F 40/56 |
| 2021/0350260 | A1 * | 11/2021 | Okajima | ................ G06N 5/025 |
| 2022/0044129 | A1 * | 2/2022 | Nidd | ......................... G06N 5/04 |
| 2024/0232170 | A1 * | 7/2024 | Plush | .................. G06F 16/2246 |

OTHER PUBLICATIONS

"UCI machine learning repository", Retrieved from: https://web.archive.org/web/20170624104253/http://archive.ics.uci.edu/ml/index.php, Jun. 24, 2017, 2 Pages.

(Continued)

*Primary Examiner* — Paulinho E Smith
(74) *Attorney, Agent, or Firm* — Cantor Colburn LLP; Renee D. Brown

(57) ABSTRACT

Systems and methods for extracting rule lists from tree ensembles are provided. A system extracts first stage candidate rules from individual trees. The system identifies the first stage candidate rules that satisfy a precision threshold and places those rules in a solution set. Subsequently, a determination is made whether a further stage is needed based on whether a predetermined number of positive data samples of the data set are covered by the solution set. In the further stage, the system generates next stage candidate rules from previous stage candidate rules that have not been pruned and identifies the next stage candidate rules that satisfy the precision threshold, placing those rules in the solution set. A simplified rule list is generated by identifying a minimum subset of rules in the solution set that covers the positive data samples within the precision threshold.

20 Claims, 13 Drawing Sheets

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| EMPTY RULE | 0&1, 1&2, 0&2 | 0.625 | TRUE |
| f0 <= 0.5 | 0&2, 1&2 | 0.67 | TRUE |
| f0 <= 0.5 & f1 <= 0.5 | 0&2, 1&2 | 0.75 | TRUE |
| f3 <= 0.5 | 0&1 | 0.25 | TRUE |
| f2 <= 0.5 & f3 <= 0.5 | 0&1 | 0.33 | TRUE |
| f0 <= 0.5 & f3 <= 0.5 | 0&1 | 0.33 | TRUE |
| f0 <= 0.5 & f2 <= 0.5 & f3 <= 0.5 | 0&1 | 0.5 | TRUE |
| f0 <= 0.5 & f1 <= 0.5 & f3 <= 0.5 | 0&1 | 0.5 | TRUE |
| f0 <= 0.5 & f1 <= 0.5 & f2 <= 0.5 & f3 <= 0.5 | 0&1 | 1.0 | TRUE |

(56)            References Cited

OTHER PUBLICATIONS

Agrawal, et al., "Fast Algorithms for Mining Association Rules", In Proceedings of the 20th VLDB Conference, vol. 1215, Sep. 12, 1994, pp. 487-499.

Angelino, et al., "Learning Certifiably Optimal Rule Lists for Categorical Data", In Repository of arXiv: 1704.01701v1, Apr. 6, 2017, 44 Pages.

Deng, Houtao, "Interpreting tree ensembles with intrees", In International Journal of Data Science and Analytics, vol. 7, Issue 4, Jun. 2019, pp. 277-287.

Friedman, et al., "Predictive learning via rule ensembles", In Journals of Annals of Applied Statistics, vol. 2, Issue 3, Sep. 2008, pp. 916-954.

Goix, et al., "scikit-learn-contrib/skope-rules", Retrieved from: https://github.com/scikit-learn-contrib/skope-rules, Dec. 11, 2020, 5 Pages.

Guidotti, et al., "Local Rule-Based Explanations of Black Box Decision Systems", In Repository of arXiv:1805.10820v1, May 28, 2018, 10 Pages.

Hara, et al., "Making tree ensembles interpretable: A bayesian model selection approach", In Proceedings of the Twenty-First International Conference on Artificial Intelligence and Statistics, Mar. 31, 2018, 9 Pages.

Larson, et al., "How We Analyzed the COMPAS Recidivism Algorithm", In ProPublica, May 23, 2016, 15 Pages.

Lundberg, et al., "A Unified Approach to Interpreting Model Predictions", In Repository of arXiv:1705.07874v2, Nov. 25, 2017, pp. 1-10.

Ribeiro, et al., ""why should i trust you?": Explaining the predictions of any classifier", In Proceedings of the Conference of the North American Chapter of the Association for Computational Linguistics: Demonstrations, Jun. 12, 2016, pp. 97-101.

Ribeiro, et al., "Anchors: High-Precision Model-Agnostic Explanations", In proceedings of the Thirty-Second AAAI Conference on Artificial Intelligence, Apr. 25, 2018, 9 Pages.

Singh, et al., "imodels: a python package for fitting interpretable models", In Journal of Open Source Software. vol. 6, Issue 61, May 4, 2021, 3 Pages.

Vidal, et al., "Born-again tree ensembles", In Proceedings of the 37th International Conference on Machine Learning, Jul. 2020, 11 Pages.

Wang, et al., "Falling Rule Lists", In Proceedings of the 18th International Conference on Artificial Intelligence and Statistics, Nov. 20, 2015, pp. 1013-1022.

Yang, et al., "Scalable Bayesian rule lists", In Proceedings of the 34th International Conference on Machine Learning, Aug. 2017, 10 Pages.

Zhou, et al., "Interpreting models via single tree approximation", In Repository of arXiv:1610.09036v1, Oct. 27, 2016, 15 Pages.

\* cited by examiner

| RULE | SCORE | RULE # | TREE |
|------|-------|--------|------|
| $f_1 = 1 \wedge f_2 = 1$ | 0.5 | 1 | 1 |
| $f_1 = 1 \wedge f_2 = 0$ | 0.1 | 2 | 1 |
| $f_1 = 0 \wedge f_3 = 1$ | 0.1 | 3 | 1 |
| $f_1 = 0 \wedge f_3 = 0$ | 0.0 | 4 | 1 |
| | | | |
| $f_3 = 1 \wedge f_1 = 1$ | 0.5 | 5 | 2 |
| $f_3 = 1 \wedge f_1 = 0$ | 0.1 | 6 | 2 |
| $f_3 = 0 \wedge f_1 = 1$ | 0.1 | 7 | 2 |
| $f_3 = 0 \wedge f_1 = 0$ | 0.0 | 8 | 2 |
| | | | |
| $f_2 = 1 \wedge f_1 = 1$ | 0.5 | 9 | 3 |
| $f_2 = 1 \wedge f_1 = 0$ | 0.1 | 10 | 3 |
| $f_2 = 0 \wedge f_1 = 1$ | 0.1 | 11 | 3 |
| $f_2 = 0 \wedge f_1 = 0$ | 0.0 | 12 | 3 |

FIG. 5B

| RULE | SCORE | RULE # | TREE |
|---|---|---|---|
| $f_1 = 1 \wedge f_2 = 1 \wedge f_3 = 1$ | 1.0 | {1,5} | {1,2} |
| $f_1 = 1 \wedge f_2 = 1$ | 1.0 | {1,9} | {1,3} |
| $f_1 = 1 \wedge f_3 = 1 \wedge f_2 = 1$ | 1.0 | {5,9} | {2,3} |
| | | | |
| $f_1 = 1 \wedge f_2 = 1 \wedge f_3 = 0$ | 0.6 | {1,7} | {1,2} |
| $f_1 = 1 \wedge f_2 = 0 \wedge f_3 = 1$ | 0.6 | {2,5} | {1,2} |
| $f_1 = 1 \wedge f_2 = 0 \wedge f_3 = 0$ | 0.2 | {2,7} | {1,2} |
| $f_1 = 1 \wedge f_2 = 0$ | 0.2 | {2,11} | {1,2} |
| $f_1 = 0 \wedge f_3 = 1$ | 0.2 | {3,6} | {1,2} |
| $f_1 = 0 \wedge f_3 = 1 \wedge f_2 = 1$ | 0.1 | {3,10} | {1,2} |
| $f_1 = 0 \wedge f_3 = 1 \wedge f_2 = 0$ | 0.1 | {3,12} | {1,3} |
| $f_1 = 0 \wedge f_3 = 0 \wedge f_2 = 1$ | 0.1 | {4,10} | {1,3} |
| $f_1 = 1 \wedge f_3 = 1 \wedge f_2 = 0$ | 0.6 | {5,11} | {2,3} |
| $f_1 = 0 \wedge f_3 = 1 \wedge f_2 = 1$ | 0.2 | {6,10} | {2,3} |
| $f_1 = 1 \wedge f_3 = 0 \wedge f_2 = 1$ | 0.2 | {7,9} | {2,3} |
| $f_1 = 1 \wedge f_3 = 0 \wedge f_2 = 0$ | 0.2 | {7,11} | {2,3} |

FIG. 5C

| RULE | SCORE | RULE # | TREE |
|---|---|---|---|
| $f_1 = 1 \wedge f_2 = 0 \wedge f_3 = 1$ | 0.7 | {2,5,11} | {1,2,3} |

| f0 | f1 | f2 | f3 | TE CLASSIFICATION |
|----|----|----|----|-------------------|
| 0 | 0 | 0 | 0 | 1 |
| 0 | 0 | 0 | 1 | 1 |
| 0 | 0 | 1 | 0 | 0 |
| 0 | 0 | 1 | 1 | 0 |
| 0 | 1 | 0 | 0 | 0 |
| 0 | 1 | 1 | 1 | 1 |
| 1 | 0 | 1 | 0 | 0 |
| 1 | 1 | 1 | 1 | 1 |

```
TREE 0
|—f0 <= 0.5
| |—f1 <= 0.5
| | |—value: 1.0
| |—f1 > 0.5
| | |—value: 0.0
|—f0 > 0.5
| |—f3 <= 0.5
| | |—value: -2.0
| |—f3 > 0.5
| | |—value: 0.0
```

```
TREE 1
|—f3 <= 0.5
| |—f2 <= 0.5
| | |—value: 0.017
| |—f2 > 0.5
| | |—value: -1.94
|—f3 > 0.5
| |—f1 <= 0.5
| | |—value: -0.067
| |—f1 > 0.5
| | |—value: 1.0
```

```
TREE 2
|—f0 <= 0.5
| |—f1 <= 0.5
| | |—value: 0.93
| |—f1 > 0.5
| | |—value: -0.035
|—f0 > 0.5
| |—f2 <= 0.5
| | |—value: -1.94
| |—f2 > 0.5
| | |—value: 0.082
```

FIG. 6A

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| EMPTY RULE | 0, 1, 2 | 0.625 | TRUE |
| f0 <=0.5 | 0, 2 | 0.67 | TRUE |
| f0 <= 0.5 & f1 <= 0.5 | 0, 2 | 0.75 | TRUE |
| f0 <= 0.5 & f1 > 0.5 | 0, 2 | 0.5 | TRUE |
| f0 > 0.5 | 0, 2 | 0.5 | TRUE |
| f0 > 0.5 & f3 <= 0.5 | 0 | 0.0 | FALSE |
| f0 > 0.5 & f3 > 0.5 | 0 | 1.0 | TRUE |
| f3 <=0.5 | 1 | 0.25 | TRUE |
| f2 <= 0.5 & f3 <= 0.5 | 1 | 0.33 | TRUE |
| f2 > 0.5 & f3 <= 0.5 | 1 | 0.0 | FALSE |
| f3 > 0.5 | 1 | 1.0 | TRUE |
| f1 <= 0.5 & f3 > 0.5 | 1 | 1.0 | TRUE |
| f1 > 0.5 & f3 > 0.5 | 1 | 1.0 | TRUE |
| f0 > 0.5 & f2 <= 0.5 | 2 | 0.0 | FALSE |
| f0 > 0.5 & f2 > 0.5 | 2 | 1.0 | TRUE |

FIG. 6B

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| EMPTY RULE | 0, 1, 2 | 0.625 | TRUE |
| f0 <=0.5 | 0, 2 | 0.67 | TRUE |
| f0 <= 0.5 & f1 <= 0.5 | 0, 2 | 0.75 | TRUE |
| f0 <= 0.5 & f1 > 0.5 | 0, 2 | 0.5 | TRUE |
| f0 > 0.5 | 0, 2 | 0.5 | TRUE |
| f0 <= 0.5 | 1 | 0.25 | TRUE |
| f2 <= 0.5 & f3 <= 0.5 | 1 | 0.33 | TRUE |

FIG. 6C

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| EMPTY RULE | 0&1, 1&2, 0&2 | 0.625 | TRUE |
| f0 <=0.5 | 0&2, 1&2 | 0.67 | TRUE |
| f0 <= 0.5 & f1 <= 0.5 | 0&2, 1&2 | 0.75 | TRUE |
| f3 <= 0.5 | 0&1 | 0.25 | TRUE |
| f2 <= 0.5 & f3 <= 0.5 | 0&1 | 0.33 | TRUE |
| f0 <= 0.5 & f3 <= 0.5 | 0&1 | 0.33 | TRUE |
| f0 <= 0.5 & f2 <= 0.5 & f3 <= 0.5 | 0&1 | 0.5 | TRUE |
| f0 <= 0.5 & f1 <= 0.5 & f3 <= 0.5 | 0&1 | 0.5 | TRUE |
| f0 <= 0.5 & f1 <= 0.5 & f2 <= 0.5 & f3 <= 0.5 | 0&1 | 1.0 | TRUE |

FIG. 6D

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| f0 > 0.5 & f3 > 0.5 | 0 | 1.0 | TRUE |
| f3 > 0.5 | 1 | 1.0 | TRUE |
| f1 <= 0.5 & f3 > 0.5 | 1 | 1.0 | TRUE |
| f1 > 0.5 & f3 > 0.5 | 1 | 1.0 | TRUE |
| f0 > 0.5 & f2 > 0.5 | 2 | 1.0 | TRUE |
| f0 <= 0.5 & f1 <= 0.5 & f2 <= 0.5 & f3 <= 0.5 | 0&1 | 1.0 | TRUE |

FIG. 6E

| RULE | TREE (SOURCE OF THE RULE) | PRECISION (FRACTION OF POSITIVES IN THE DATA THAT SATISFIES THE RULE) | VALIDITY (THERE IS SOME POSITIVE DATA THAT SATISFIES THE RULE) |
|---|---|---|---|
| f3 > 0.5 | 0 | 1.0 | TRUE |
| f0 <= 0.5 & f1 <= 0.5 & f2 <= 0.5 & f3 <= 0.5 | 0&1 | 1.0 | TRUE |

FIG. 6F

GENERATING RULE LISTS FROM TREE ENSEMBLE MODELS

TECHNICAL FIELD

The subject matter disclosed herein generally relates to tree ensemble artificial intelligence (AI) models. Specifically, the present disclosure addresses systems and methods that generate and use rule lists from tree ensemble AI models.

BACKGROUND

Recently, many decision support systems have been constructed as black box models using machine learning such as tree ensembles and deep neural networks. Tree ensemble models, such as gradient boosted trees and random forests, combine several decision trees to produce better predictive performance than utilizing a single decision tree. However, tree ensemble models generally lack transparency and interpretability, resulting, for example, in humans having difficulty understanding their decision logic. This lack of understanding of the internal logic of decision systems can cause issues, especially for critical tasks.

Conventionally, most global methods for rule extraction generate rule lists with rules from the leaf nodes of individual trees in a tree ensemble. Each rule list is a human understandable list of rules that are a decomposition of a decision-making process of the models (e.g., captures conditions for decision making by the models). A shortcoming of these techniques is that they do not consider rules formed with cross-tree interactions (e.g., interactions between trees of the tree ensemble). This often results in lower fidelity of the rules even for relatively simple tree ensembles, whereby fidelity is defined as a proportion of data points (e.g., of a data sample) on which a rule list prediction agrees with a tree ensemble prediction.

BRIEF DESCRIPTION OF THE DRAWINGS

Some embodiments are illustrated by way of example and not limitation in the figures of the accompanying drawings.

FIG. 5B-FIG. 5D illustrate sample tables of rules and scores based on the tree ensemble of FIG. 5A.

FIG. 6A-FIG. 6F illustrate an example tree ensemble flow for another example tree ensemble.

DETAILED DESCRIPTION

Figure 1:
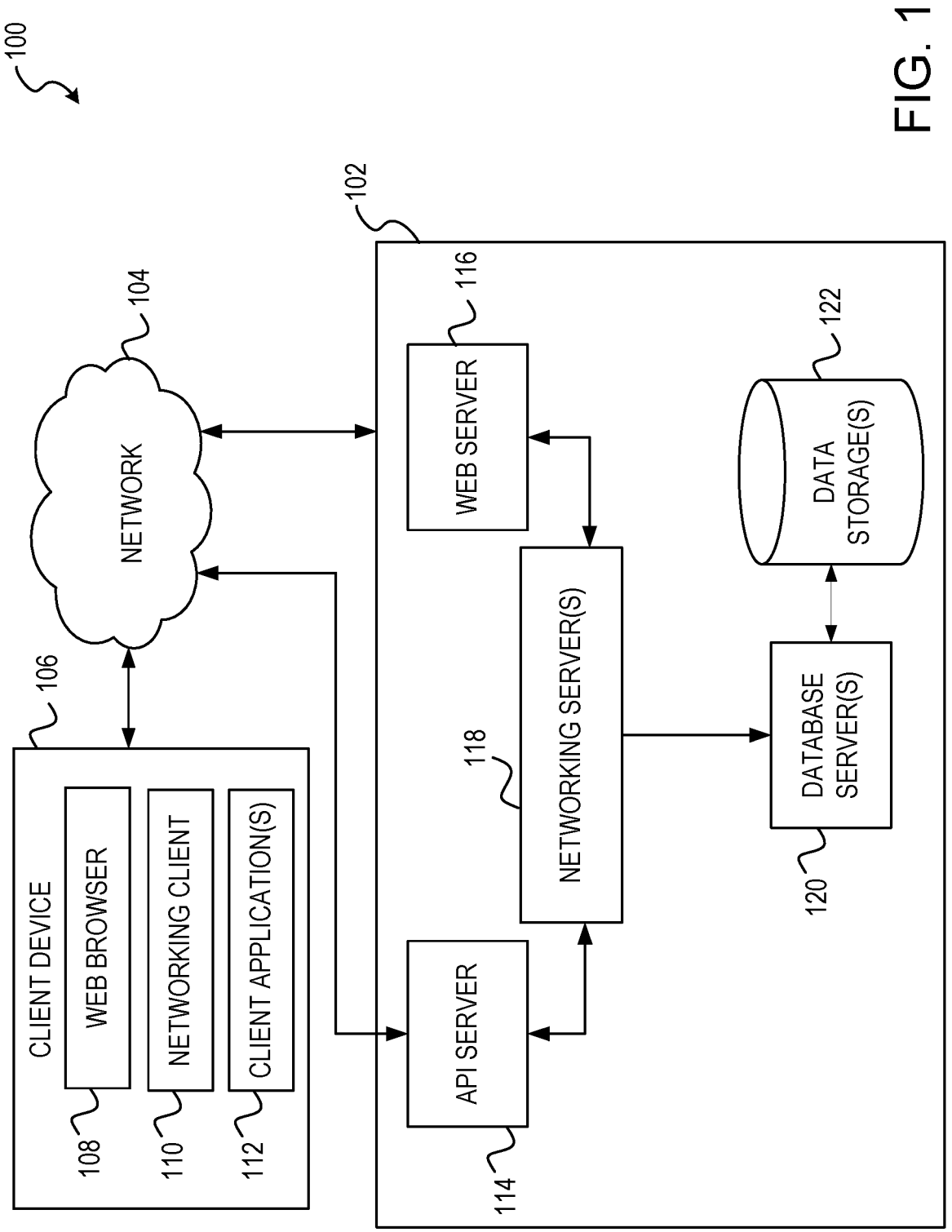
FIG. 1 is a diagram illustrating a network environment suitable for generating rule lists from tree ensembles, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide systems and methods that generate rule lists from tree ensembles which comprise a plurality of decision trees. More specifically, example embodiments generate rule lists that consider cross-tree interactions. These rule lists are exact decompositions of the models' decision-making process (i.e., the processing that the models perform when they make decisions) or at least exact to within a tunable precision/fidelity threshold (e.g., 95% accuracy). As a result, the rule lists provide transparency to the decision-making process of the models.

The rule lists are human understandable and capture what the models are doing. Accordingly, the rule lists are short such that even very complicated tree ensembles can be converted to a short rule list (e.g., 30-200 rules). Each rule is also small (e.g., covers 3-5 features) even if the tree ensemble takes hundreds of features as input.

Furthermore, the generation of the rule lists is tunable. If a user desires a smaller rule list, the user can choose to allow for some loss of accuracy between the model and the rule list. For example, there may be levers or selectable options in a rule generation algorithm that allow the process to execute longer in order to get a fully accurate model (e.g., perfect fidelity) or allow the process to be less accurate (e.g., 95% accuracy or precision) to the original model in order for the process to be faster and the rule list smaller. Additionally, by using the less accurate process, less processing time and processing power is needed.

Example embodiments provide technical and practical advantages. In a first user case, a generated rule list can indicate why certain actions were automatically performed by a networking system. For example, the networking system may perform critical AI tasks such as fake account detection and account takeover detection and may automatically block or deactivate these accounts. Reviewers may need to understand if the models' predictions make sense and why the models identified the accounts as fake or taken over. As such, the rule list provides reviewers an accurate and simplified reference that will allow the reviewer to quickly make a decision with respect to blocked or deactivated accounts (e.g., confirming that an account should be blocked; providing feedback to a user who has their account block as to why it was blocked).

In another use case, a user may receive job recommendations which are not in line with what the user is looking for. The user may complain, which gets escalated. Instead of having the reviewer look through all the features that the model was using and making a guess as to why the network system performed an action (e.g., gave a bad recommendation), the reviewer can just query the rule list. It is noted that the reviewer can be a human reviewer or a machine reviewer (e.g., a chatbot).

In a third user case, model developers want to understand why models made particular decisions in order to inspect the models and determine if the models are in line with design choices (e.g., Which features did a model use and why; are the features being used in the same way that an AI modeler thought it should be used?). In some cases, if the model performs an action that is different from what the AI modeler had in mind when building the model, the resulting operation can cause customer complaints.

A fourth use case addresses model forgetfulness. Over time, there are new trends and new models are trained based on the new trends and data. As a result, older data and older rules may be discarded or lost. For instance, fake account models may be trained with data for a set of current attacks by which people are crafting these fake accounts. The models being trained today learn these kinds of attacks and block them, but over time, the attacks change. New attacks result in new models trained with new data. The new attacks are learned, but the old attacks may be discarded, and it is assumed that the old attacks will not come back. By having transparency into the older models, there is knowledge of all the reasons why fake accounts were blocked in the past when training a new model. Thus, as new models are launched, the old rules can still be kept and used.

In yet another use case, when recommendations are provided to users, the reasons why the users were shown the particular recommendations can be provided. These recommendations can include member recommendations, follow recommendations, job recommendations, company recommendations, hashtag recommendations, and so forth.

Accordingly, the present disclosure provides technical solutions that analyze machine-trained tree ensembles to extract rules and generate a simplified rule list that covers positive data samples within a precision threshold. In some embodiments, the precision threshold can be tuned to be less than 100% fidelity. The tuning allows for faster generations of the simplified rule list, with slightly less accurate results, that require less processing power and computing resource usage. Further still, example embodiments prune (e.g., discard from further consideration; do not consider) previous stage candidate rules that have no support in the positive data sample. As such, the pruned previous stage candidate rules are not considered in a next stage of rule generation and evaluation. Therefore, the pruning of candidate rules provides a further technical advantage in that the rule list can be generated more quickly while using less processing power and bandwidth. These advantages and others will be discussed in more detail below.

FIG. 1 is a diagram illustrating a network environment 100 suitable for generating rule lists from tree ensembles, in accordance with example embodiments. A network system 102 provides server-side functionality via a communication network 104 (e.g., the Internet, wireless network, cellular network, or a Wide Area Network (WAN)) to one or more client devices 106. In example embodiments, the client device 106 is a device of a user that is associated with a networking platform (e.g., a social network platform) provided by the network system 102. In example embodiments, the network system 102 comprises components that host and manage the networking platform. In various embodiments, the network system 102 trains and analyzes a plurality of tree ensembles as will be discussed in more detail below.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the client device 106 comprises a display module (not shown) to display information (e.g., in the form of user interfaces). In further embodiments, the client device 106 comprises one or more of a touchscreen, accelerometer, camera, microphone, and/or Global Positioning System (GPS) device.

The client device 106 may include one or more applications (also referred to as "apps") such as, but not limited to, a web browser 108, a networking client 110, and other client applications 112, such as a messaging application, an electronic mail (email) application, and the like. In some embodiments, if the networking client 110 is present in the client device 106, then the networking client 110 is configured to locally provide a user interface for the application and to communicate with the network system 102, on an as-needed basis, for data and/or processing capabilities not locally available. Conversely, if the networking client 110 is not included in the client device 106, the client device 106 may use the web browser 108 to access the network system 102.

In some embodiments, a user of the client device 106 accesses the network system 102 in order to access a network platform and network connections (e.g., social network connections). In these embodiments, the user may be a member of the network platform. The user can perform searches (e.g., a job searches) on the network platform, view their feeds, make connections, message other members, and perform other operations provided by the network system 102. In various cases, the user can view recommendations and feeds that include reasons as to why they are being presented the content. These reasons are based on the generated rule lists as will be discussed in more detail below.

In other embodiments, a user of the client device 106 accesses the network system 102 in order to view or utilize rule lists generated by the network system 102. In these embodiments, the user may be an employee of the network platform or otherwise associated with the network platform in a work capacity. For example, the user can be a model developer that uses the rule lists in generating new models or a customer service agent that searches rule lists to provide feedback to a customer (e.g., why their account was blocked).

Turning specifically to the network system 102, an application programing interface (API) server 114 and a web server 116 are coupled to, and provide programmatic and web interfaces respectively to, one or more networking servers 118. The networking server(s) 118 host the network platform, which may comprise one or more modules, applications, or engines, and which can be embodied as hardware, software, firmware, or any combination thereof. In example embodiments, the networking server 118 manages the generation of rule lists from tree ensembles. The networking server 118 will be discussed in more detail in connection with FIG. 2.

The networking servers 118 are, in turn, coupled to one or more database servers 120 that facilitate access to one or more information storage repositories or data storage(s) 122. In one embodiment, the data storage 122 is a storage device that stores content (e.g., user profiles including connections and posts; tree ensemble models, training data) that is used by the network system 102.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of user devices 106 may be embodied within the network environment 100. While only a single network system 102 and single networking server 118 is shown, alternative embodiments may contemplate having more than one network system 102 or more than one networking server 118 to perform server operations discussed herein.

Figure 2:
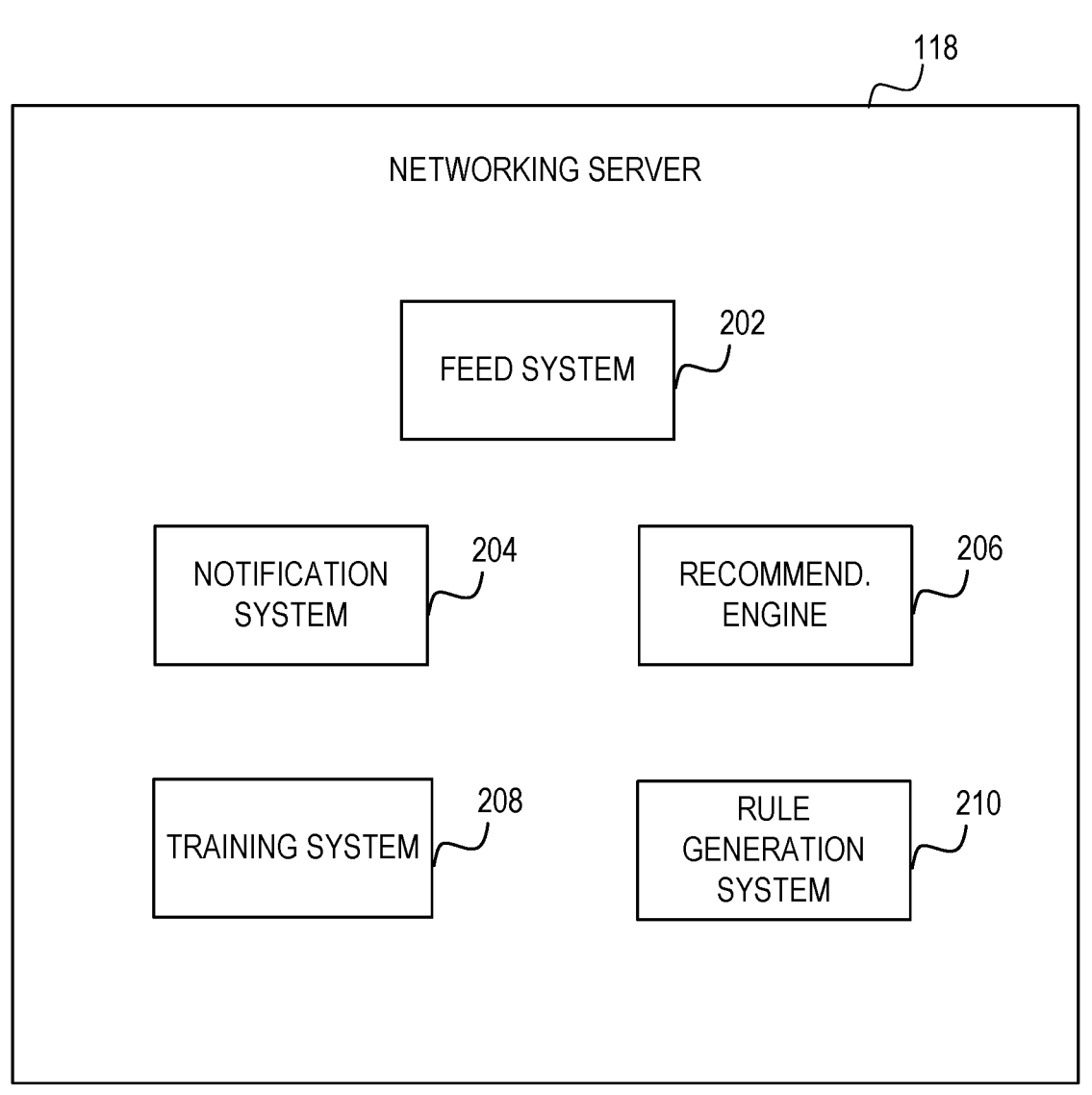
FIG. 2 is a block diagram illustrating components of a networking server, according to some example embodiments.

FIG. 2 is a block diagram illustrating components of the networking server 118, according to some example embodiments. In various embodiments, the networking server 118 hosts the networking platform that includes functionalities to provide feeds, train machine-learning (ML) or artificial intelligence (AI) models, and analyze these models to generate rule lists. To enable these operations, the networking server 118 comprises a feed system 202, a notification system 204, a recommendation engine 206, a training system 208, and a rule generation system 210 all configured to communicate with each other (e.g., via a bus, shared memory, or a switch). The networking server 118 may also comprise other components (not shown) that are not pertinent to example embodiments. Furthermore, any one or more of the components (e.g., engines, systems, modules) described herein may be implemented using hardware (e.g., a processor of a machine) or a combination of hardware and software. Moreover, any two or more of these components may be combined into a single component, and the functions described herein for a single component may be subdivided among multiple components.

The feed system 202 manages feeds of each (member) user. A user's feed comprises content that is relevant to the user and can include items in different categories. For example, the feed may contain insights from the user's network (e.g., connections), companies/entities the user follows, sponsored content, and other posts that the network platform believes the user may be interested in. The feed can also include one or more of recommendations including job recommendations, connection recommendations, news, and articles. In various embodiments, these recommendations can include an indication of why the recommendations are made to the user, as will be discussed further below.

The notification system 204 manages notifications that are provided to users of the networking platform. Notifications can comprise notices about the user, themselves, their activities, and their connections. The notifications can be about invitations and messages, jobs and opportunities, activities in the user's social network, activities that involve the user, news and articles, offers and tips, and updates from events. Notifications can include both offline notifications (e.g., time-insensitive notifications) and real-time notifications.

The recommendation engine 206 determines how to best grow a user's network, increase engagement within the user's network, and/or update one or more recommendation platforms. In one embodiment, the recommendation engine 206 applies collected data to predictive models (e.g., the tree ensembles) to derive recommendations for future connections (e.g., modeling or updating the recommendation platform) or for job recommendations. These predictive models may be accessed from the data storage 122 and be machine-learned by the network system 102, as discussed further below.

In one embodiment, the recommendation engine 206 can recommend types of connections a user should be forming to grow their network over a period of time or for their next n-number of connections. In another embodiment, given that a user's network comprises certain connections, member follows, companies, groups, hashtags, and so forth, the recommendation engine 206 can recommend an improved balance between different connection types for each user given their current network composition (referred to as "macro-guidance"). In some cases, the recommendation engine 206 (e.g., connection recommendation systems) provides a ranked list of recommended entities/connections (e.g., people you may know, follow recommendations, hashtags, group recommendations) for a given user. The predictive models can provide a relevance score for a (user, entity) pair which is used to determine a position in the ranked list.

The training system 208 machine-trains models, including the tree ensembles, that are used by the network system 102 for various operations such as providing job recommendations, providing connection recommendations, and detecting fake accounts. The training system 208 will be discussed in more detail in connection with FIG. 3 below.

The rule generation system 210 is configured to generate rule lists from tree ensembles that considers cross-tree interactions (e.g., interactions between trees of the tree ensemble). The rule generation system 210 unpacks the opaque models of the tree ensembles and "converts" the models into human understandable lists of rules that are an exact decomposition or within a tunable threshold (e.g., 95% precision) of the models. In other words, the rule generation system 210 generates rule lists of decision-making processes of the models, such that the decision making is transparent and human understandable. The rule generation system 210 will be discussed in further detail in connection with FIG. 4-FIG. 7 below.

Figure 3:
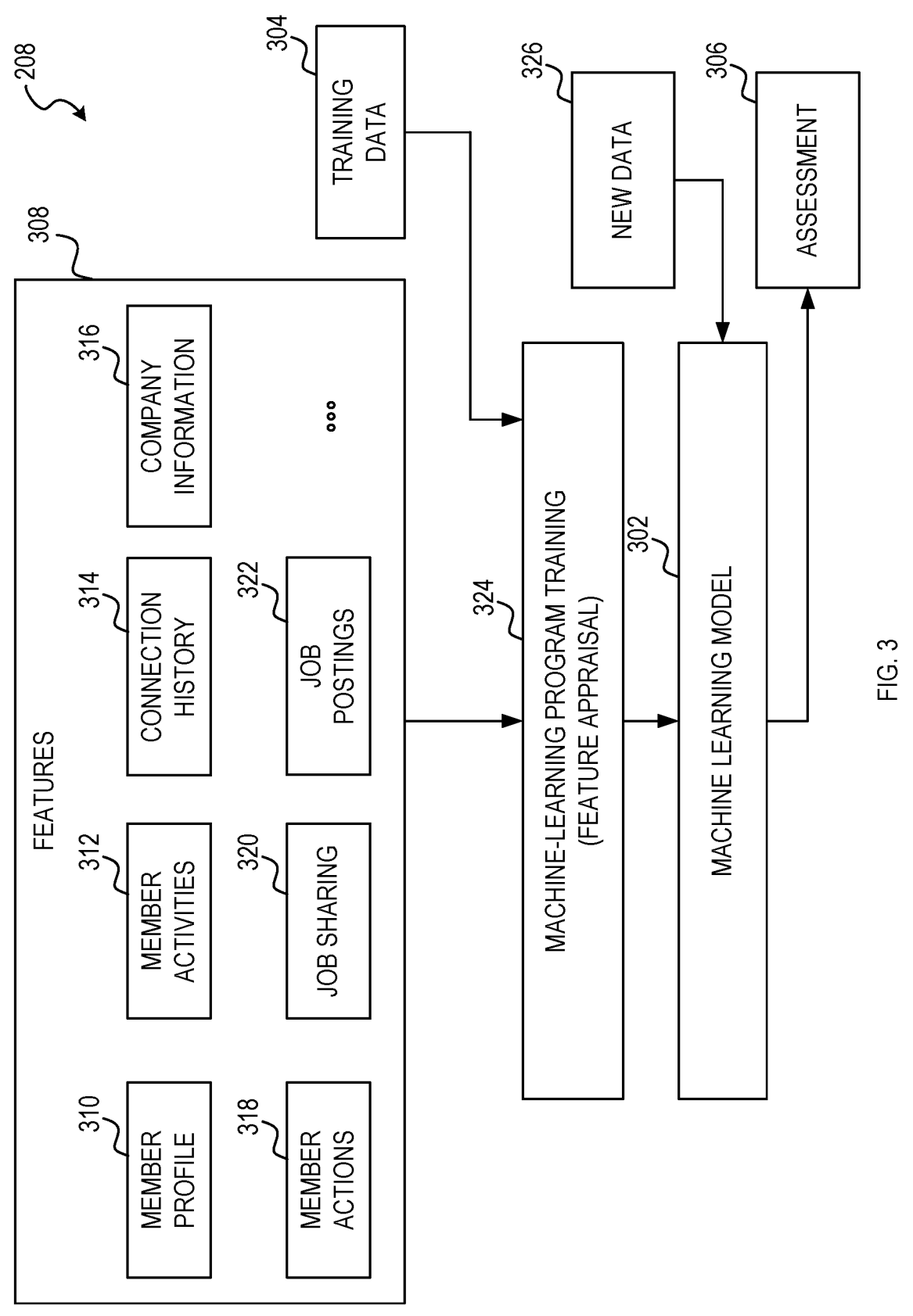
FIG. 3 is a block diagram illustrating components and operations of a training system, according to some example embodiments.

FIG. 3 is a block diagram illustrating components and operations of the training system 208, according to some example embodiments. Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 302 from example training data 304 in order to make data-driven predictions or decisions expressed as outputs or assessments 306. In example embodiments, the ML models 302 include the tree ensembles. These ML models 302 are used for various networking platform operations such as, for example, calculating a job-post relevance, determining job recommendations, determining connection recommendations, and detecting fake accounts. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data 304, best approximates the relationship between the training inputs and outputs so that the ML model 302 can implement the same relationships when given inputs to generate the corresponding outputs. Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (e.g., Is this object an apple or an orange?). Regression algorithms aim at quantifying some items (e.g., by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 304 comprises examples of values for features 308. In some example embodiments, the training data 304 comprises labeled data with examples of values for the features 308 and labels indicating the outcome. The machine-learning algorithms utilize the training data 304 to find correlations among identified features 308 that affect the outcome. A feature 308 is an individual measurable property of a phenomenon being observed. The concept of a feature 308 is related to that of an explanatory variable used in statistical techniques such as linear regression. Choosing informative, discriminating, and independent features is important for effective operation of ML in pattern recognition, classification, and regression. Features 308 may be of different types, such as numeric, strings, categorical, and graph.

In one example embodiment, the features 308 may include one or more of member profile information 310, member activity information 312 (e.g., articles read, jobs applied to, connections made, articles posted, jobs posted), connection history 314, company information 316, member actions 318, jobs sharing 320, job postings 322, and so forth. These features 308 can be derived from information stored to the data storages 122.

During training 324, an ML algorithm or ML tool, analyzes the training data 304 based on identified features 308 and configuration parameters defined for the training. Training the ML model 302 involves analyzing large amounts of data (e.g., from several gigabytes to a terabyte or more) in order to find data correlations. The ML algorithms utilize the training data 304 to find correlations among the identified features 308 that affect the outcome or assessment 306. In some example embodiments, the training data 304 includes labeled data, which is known data for at least one identified feature 308 and at least one outcome.

The result of the training 324 is the ML model 302 that is capable of taking inputs to produce assessments 306. Subsequently, when the ML model 302 is used to perform an assessment, new data 326 is provided as an input to the ML model 302, and the ML model 302 generates the assessment 306 as output. In some example embodiments, results obtained by the model 302 during operation (e.g., assessments 306 produced by the model 302 in response to inputs) are used to improve the training data 304, which is then used to generate a newer/updated version of the model 302. Thus, a feedback loop is formed to use the results obtained by the model 302 to improve the model 302.

Figure 4:
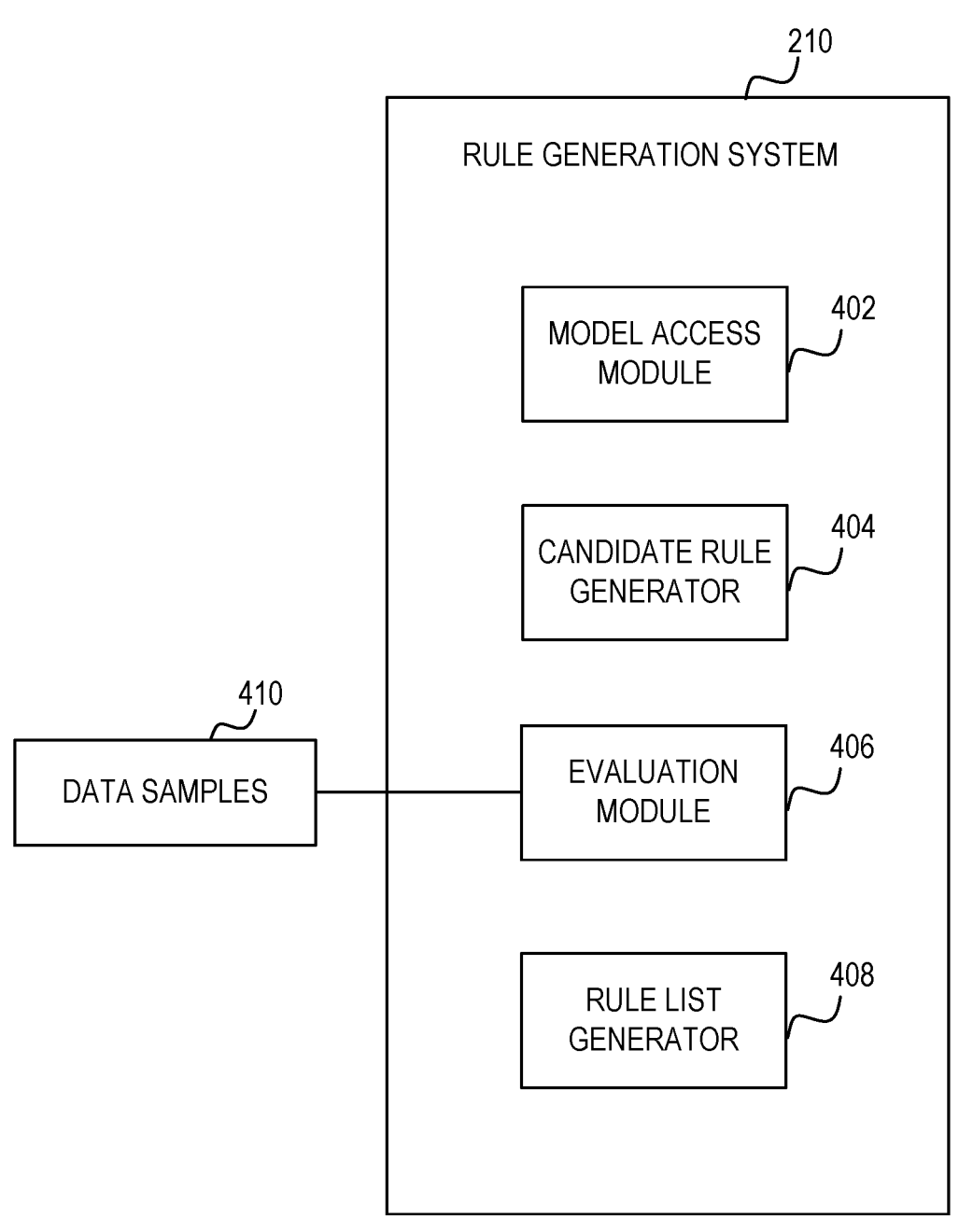
FIG. 4 is a block diagram illustrating components of a rule generation system, according to some example embodiments.

FIG. 4 is a block diagram illustrating components of the rule generation system 210, according to some example embodiments. The rule generation system 210 is configured to generate rule lists that take into consideration cross-tree interactions of tree ensembles. The rule lists are an exact decomposition or within a tunable threshold (e.g., 95% precision) of the tree ensembles that provide transparency into the decision-making process of the models. To enable these operations, the rule generation system 210 comprises a model access module 402, a candidate rule generator 404, an evaluation module 406, and a rule list generator 408 all of which are communicatively coupled (e.g., via a bus, shared memory, or a switch).

Generally, the network system 102 comprises a binary tree ensemble classifier with T trees. The tree ensemble makes classifications according to an equation:

$$f_{TE}(x) = \begin{cases} 1, & \text{if } \sum_{t=1}^{T} w_t f_t(x) + b > c \\ 0, & \text{otherwise} \end{cases} \quad (1)$$

where $w_t$ is the weight of tree t, b is a bias term, c is the decision threshold of the tree ensemble (TE), and x is a datapoint (from a sample data set). In sum, equation (1) makes predictions/decisions that are 1 or 0. Predictions for individual trees are summed up. If the tree ensemble score is greater than a threshold, c, then the result is 1. Otherwise, it is 0.

The tree ensemble is decomposed into a rule list (RL) by searching for high-precision rules for one of the labels (e.g., $f_{TE}(x)=1$) until most instances with the label is covered by at least one rule from the rule list. All the uncovered instances are assigned a different label. Generally, the rule list should satisfy three properties. The first property is that the rule list should mimic the tree ensemble for most inputs (i.e., high fidelity): $f_{TE}(x) \approx f_{RL}(x)$, where $$f_{RL}(x) = \begin{cases} 1, & \text{if } x \text{ satisfies at least 1 rule from the } RL \\ 0, & \text{otherwise.} \end{cases} \quad (2)$$

This equation indicates how decision making for the rule list occurs. Specifically, for a set of rules, if a datapoint, x, (from a sample data set) satisfies any of the rules, then the rule list will indicate 1. Otherwise, it is 0. The rule list is generated for a positive class, such that a data instance will be classified as positive by the tree ensemble if it satisfies any rules of the rule list, otherwise it is negative. The goal is to have $f_{TE}(x)$ match $f_{RL}(x)$ for all datapoints.

For the second property, the rule list should be short, and the rules be simple enough to be comprehensible by humans (i.e., high interpretability). A final property is that the algorithm should converge quickly (e.g., in a short run-time) even when explaining large data sets and high-complexity tree ensemble models (i.e., high scalability).

In example embodiments, the rule list is evaluated for two tasks. The first task is global-level model decomposition: explain or substitute the tree ensemble with a high-fidelity and interpretable rule list. The second task is instance-level outcome explanation: explain each individual instance with a high-precision, high-recall, and interpretable rule.

The rule generation system 210 starts with an empty list and adds rules in order to cover more positive samples. This is done by generating candidate rules. Accordingly, the model access module 402 accesses the tree ensemble that will be analyzed. In some embodiments, the tree ensemble may be accessed from the data storage(s) 122. In other embodiments, the tree ensemble may be accessed from the training system 208.

The candidate rule generator 404 generates the candidate rules. The candidate rules are generated by traversing the nodes of the trees in the tree ensemble. Thus, a candidate rule can be a conjunction of all feature splits from a root to a selected node. A number of a stage of the candidate rule generation process indicates a number of trees from which the rules are extracted. Thus, during a first stage of candidate rule generation (stage 1), the rules are extracted from individual trees of the tree ensemble by taking a conjunction of the decisions along a path from a root to each node.

During a second stage (stage 2), the rules are formed by combining rules from two trees. During a third stage (stage 3), the rules are formed by combining rules from three trees, and so forth.

Figure 5A:
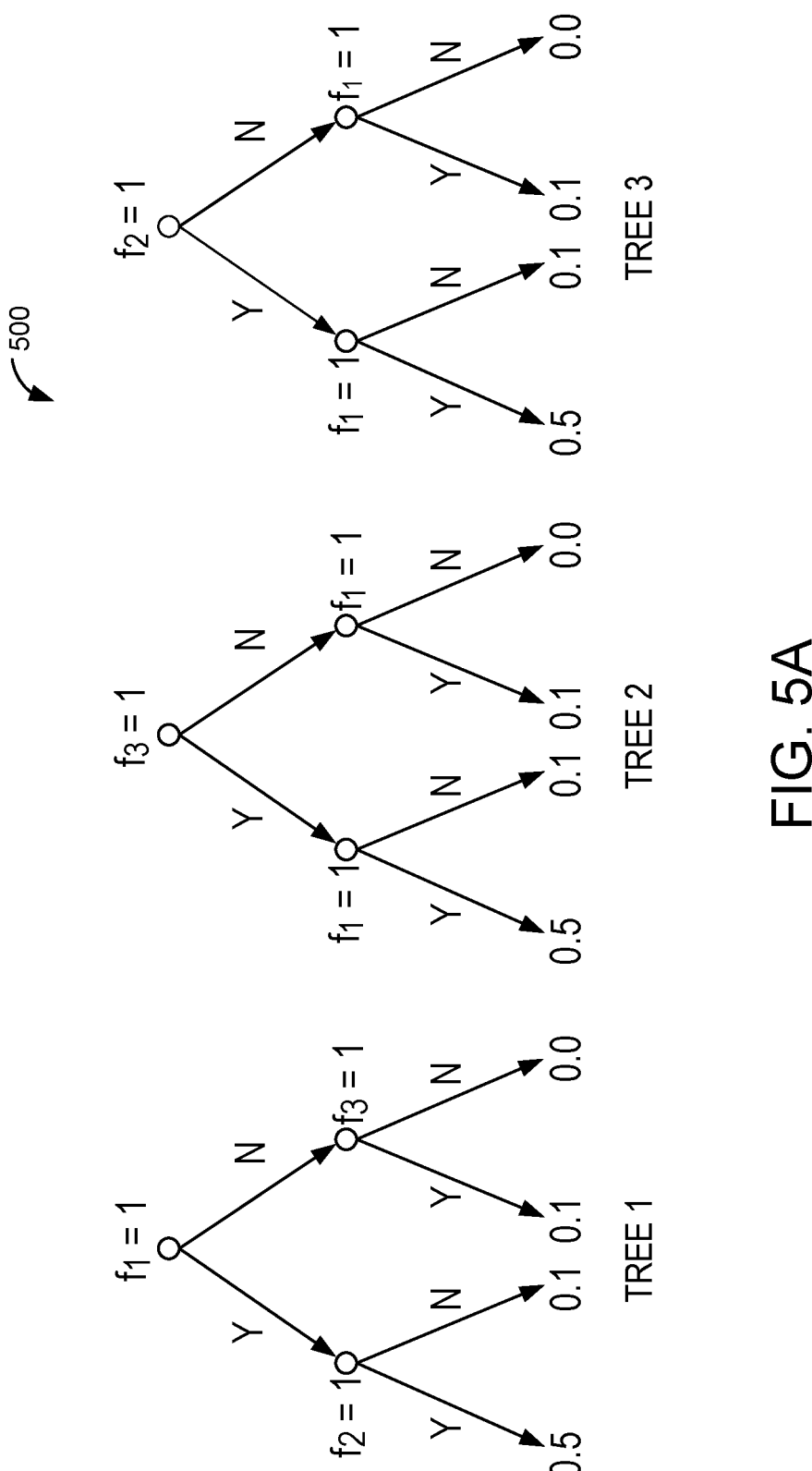
FIG. 5A illustrates an example of a tree ensemble.

As an example and referring to FIG. 5A, an example tree ensemble 500 is shown. The example tree ensemble 500 comprises three trees. As shown, Tree 1 makes a split on root node $f_1=1$ with a yes branch and no branch. With the yes branch, $f_2=1$ will split into yes and no branches, and the no branch $f_3=1$ will also split into yes and no branches. The splits end at leaf nodes with an assigned score (e.g., scores assigned during the training of the model). At stage 1, each node of each tree can be a candidate rule. Thus, for Tree 1, a candidate rule can be $f_1=1$. If $f_2=1$ in Tree 1 is selected, then the candidate rule generator 404 travels up to the root node ($f_1$) to generate the candidate rule. As a result, the candidate rule is $f_2=1$ and $f_1=1$ (represented as $f_1=1 \wedge f_2=1$), which is a conjunction of all the feature splits from the root to the selected node. The candidate rule generator 404 will perform this for each node of each tree at stage 1.

At stage 2, rules from two different trees are combined. After stage 1, candidate rules from all the individual trees have been extracted. The candidate rule generator 404 can take any two rules from two different trees and create a conjunction. For example, the candidate rule generator 404 can take the candidate rule $f_2=1 \wedge f_1=1$ from Tree 1 and combine it with a candidate rule $f_3=1$ from Tree 2 to generate a stage 2 candidate rule of $f_1=1 \wedge f_2=1 \wedge f_3=1$. The number of stages is dependent on the number of trees and can continue until all tree combinations are made or all data samples are covered by a rule.

Returning to FIG. 4, the evaluation module 406 evaluates the candidate rules at each stage. The evaluation module 406 evaluates each candidate for two conditions: (i) rule precision exceeds a minimum configured precision threshold; and (ii) rule support (e.g., positive instances covered by a solution set) is not empty (e.g., there are positives in the rule that can be explained). For the first condition, the evaluation module 406 determines if a fraction of predicted positives among data that satisfies the candidate rule being considered exceeds a precision threshold (e.g., how many data samples 410 satisfy the candidate rule). If the candidate rule is below the precision threshold, the candidate rule is not considered. However, if the rule precision condition is true, the candidate rule is added to a solution set and removed from the candidate set. In some embodiments, the data samples 410 comprise training data used to generate the models.

For the second condition, the evaluation module 406 determines if, given the candidate rule, the data samples are scored in a consistent manner. For instance, if 95% of the data samples that satisfy the candidate rule are labeled as positive, then the evaluation module 406 determines the candidate rule is a good rule. However, if 50% of the data samples 410 are labeled as negative, then the evaluation module 406 may need to wait for more stages to be combined to make a clear determination. If the rule support condition is false, then the candidate rule is removed from candidate set, as it cannot grow into a solution (due to absence of new positives).

User-specified minimum precision also allows the algorithm to extract shorter/less number of rules by allowing for some false positives. For example, the rule generation system 210 may provide a tunable selection to a user to reduce the accuracy (e.g., to 95% precision). Given the candidate rules, the evaluation module 406 determines if the tree ensemble makes an assumed decision at least for the selected accuracy. For example, if the tunable accuracy is 94%, does 94% of the data samples satisfy a candidate rule that the tree ensemble scores as a positive label. If so, the candidate rule is added to the solution set. By reducing accuracy, example embodiments can perform the rule generation process faster and require less processing power and bandwidth. However, the accuracy/precision threshold can be fixed or defaulted to be 1.0 in some embodiments.

At stage 1, a score is determined for each candidate rule from each tree. Referring back to FIG. 5A, for the candidate rule $f_1=1 \wedge f_2=1$, the candidate rule generator 404 traverses the nodes to generate the candidate rule and obtain a score of 0.5. Similarly, for candidate rule $f_3=1 \wedge f_1=0$ from Tree 2, the score is 0.1. FIG. 5B is a table that shows the candidate rules generated for each of the leaf nodes of the tree ensemble 500 at stage 1, the score for each candidate rule, and the tree from which the candidate rule was generated. The table also labels each candidate rule with a rule number for ease of discussion. Assuming a precision threshold of 0.7, none of the candidate rules satisfy the threshold. Therefore, none of the candidate rules are added to the solution set at stage 1.

If there were rules that satisfied the threshold, these rules would be solution rules that are added to a solution set, and the rules that do not satisfy the threshold are added to the candidate set for rules for evaluation in the next stage. Once the solution rules that meet the threshold are added to the solution set, they are dropped from further consideration and are not processed further, that is, the solution rules added to the solution set are not evaluated in subsequent stages. This process may be referred to as pruning.

Once the iterations through the different stages end, the method further simplifies the rules in the solution set using a greedy approach to find the minimum subset of rules that cover the required number of positive samples to meet the precision criteria. The greedy method is an algorithmic technique that builds up a solution to a large problem incrementally by solving increasingly large subproblems. In one embodiment, the greedy algorithm starts with an empty set, and at each iteration, the algorithm selects the best rule (e.g., rule with the highest score, rule that provides the highest increase in coverage of the positive samples from the data set) to be added to the simplified set. The process is repeated by adding the best rule that would improve the positive samples in the data set until the precision target is met or until there is no further improvement to the coverage of the data set when adding more rules. Other embodiments may use other variations of greedy algorithms. Afterwards, the simplified subset of rules from the solution set is returned as an output.

Any rules with no positive label in the data that satisfy the rule is considered an irrelevant combination of features. As shown in FIG. 5B, there are three rules that have a score of 0.0 and are thus irrelevant. These irrelevant rules can be pruned at the end of the first stage and not considered for combination in subsequent stages.

The rule support (e.g., positive instances covered by a solution/data set) goes down as candidate rules grow by adding more clauses (e.g., conjunction rules). Hence, pruning by rule support considerably shrinks the search space of rules by not growing candidate rules that cannot be part of the solution rule list any further. This property is often referred to as the Anti-Monotone property which has been effectively exploited in many association rule mining algorithms like the Apriori Algorithm. This allows decomposing larger tree ensembles.

At every stage, the candidate rules get larger (e.g., number of clauses gets bigger). Based on the Anti-Monotone property, with a rule that has multiple clauses, the number of potential data points (data samples 410) that can satisfy the candidate rule will go down. Thus, the candidate rules will have less support (e.g., number of data samples 410 they can satisfy) because the rules are bigger. The evaluation module 406 can prune candidate rules that have less than a threshold amount of support, and this pruning increases as the number of stages increases. In one case, the evaluation module 406 prunes candidate rules with no support. Accordingly, for any K-stage candidate that is viable (e.g., has some support), all the smaller candidates (K–1 candidates of that K-stage candidate) should be valid in the K–1 stage as well. For instance, assume $f_1=1 \wedge f_2=1 \wedge f_3=1$ is a valid candidate, then $f_1=1 \wedge f_2=1$, $f_2=1 \wedge f_3=1$, and $f_1=1 \wedge f_3=1$ should be valid in stage 2. If they are not valid, then the stage 3 candidate rule cannot happen. For example, $f_1=0 \wedge f_3=0$ does not have support in stage 1. Therefore, a stage 2 candidate rule of $f_1=0 \wedge f_2=0 \wedge f_3=0$ does not need to be considered by the evaluation module 406.

At stage 2, the candidate rules from stage 1 that remain are used to combine rules from two trees and the corresponding scores are also combined. Assume a candidate rule of $f_1=1 \wedge f_2=1 \wedge f_3=0$. From Tree 1, $f_1=1 \wedge f_2=1$ provides a score of 0.5 (as shown in FIG. 5A and FIG. 5B). From Tree 2, $f_3=0 \wedge f_1=1$ results in a score of 0.1. The two scores are combined to obtain a total score of 0.6. This total score is still below the precision threshold and, thus, the candidate rule $f_1=1 \wedge f_2=1 \wedge f_3=0$ is not a solution rule.

In another example, assume the candidate rule is $f_1=1 \wedge f_2=1 \wedge f_3=1$. From Tree 1, $f_1=1 \wedge f_2=1$ provides a score of 0.5. From Tree 2, $f_3=1 \wedge f_1=1$ results in a score of 0.5. The two score are combined to obtain a total score of 1.0. This total score is above the precision threshold and, thus, the candidate rule $f_1=1 \wedge f_2=1 \wedge f_3=1$ is added to the solution set.

FIG. 5C is a table showing the candidate rules generated from two trees at stage 2, the total score for each candidate rule, and the trees from which each candidate rule was generated. The table also indicates the rule number of the candidate rules that were combined. Assuming the precision threshold of 0.7, three candidate rules (shown at the top) now satisfy the threshold and become part of the solution set.

The evaluation module 406 continues to stage 3 to generate candidate rules from three trees if there are still unexplained positive samples in the data. For ease of discussion, the example tree ensemble 500 results in one additional rule at stage 3 (shown in FIG. 5D) that is added to the solution set. If all positive cases for the sample data are explained by the rules generated at the second stage, then a third stage would be unnecessary.

The rule list generator 408 is configured to simplify the solution set or rule list which may have multiple rules covering the same set of data samples 410. The rule list generator 408 simplifies the rule list by finding a minimum subset of rules in the rule list that covers the configured minimum number of positive cases. In example embodiments, the rule list generator 408 uses a greedy approach to find the minimum subset of rules covering the positives. Thus, the rule list generator 408 finds the most important rules by identifying which rules in the rule list cover most or all of the data samples 410.

FIG. 6A-FIG. 6F illustrate an example tree ensemble flow for another example tree ensemble. The tree ensemble flow provides an example where all positive data samples are covered prior to the maximum number of stages being performed. Referring to FIG. 6A, an example tree ensemble with three trees is shown. Each tree assigns a score to a data instance at a leaf node. Each data instance is scored by the tree ensemble as a sum of scores from each tree. Any data instance with a positive score is classified as a positive class. Otherwise, it is classified as a negative class.

An example data set 600 scored by the tree ensemble is also shown. Input features consist of four binary features. Positive class classification is labeled as 1 and negative classification as 0 in the data set 600.

For stage 1 and referring to FIG. 6B, the rule generation system 210 extracts rules from each tree. Any rule which satisfies (e.g., greater than or equal to) a precision threshold is considered a solution rule (e.g., marked in bold) that explains some portion of the tree ensemble. In this example, the precision threshold is 1. These rules that satisfy the precision threshold are kept aside as solutions to be compiled into a rule list but dropped or pruned from consideration for combination in successive stages.

Any rule with no positive label (e.g., precision score of 0 and false validity) in the data that satisfies the rule is considered an irrelevant combination of input features. These rules are dropped/pruned after stage 1 and not considered for combination in successive stages.

At the end of stage 1, there are still a few unexplained positive samples in the data. These corresponding rules are shown in FIG. 6C. As a result, a further stage is needed.

In stage 2, the rule generation system 210 takes a conjunction of pairs of rules extracted from stage 1 that remain (after pruning) to make new rules that will be evaluated at this stage. As shown in FIG. 6D, one additional rule (shown in bold at the bottom) satisfies the precision threshold. This additional rule is added to the solution set.

In this embodiment, for each rule, the precision score is directly calculated from the data that is stored by the tree ensemble. To calculate the precision score, when a first candidate rule is merged with a second candidate rule from stage 1 to form a third candidate rule in stage 2, the precision score for the third candidate rule Z is obtained from the scored data by calculating the fraction of positives in the scored data that satisfy the rule (e.g., the number of positives that satisfy the third candidate rule divided by the total number of values in the data). When the precision score of the third candidate rule is above the threshold for selecting rules, then the third candidate rule is added to the solution set.

At the end of stage 2, there are no more unexplained positive samples in the data. Hence, no further stages are required (even though there are three trees). Instead, the rule generation system 210 compiles the solution rules (e.g., accesses the solution set) from stage 1 and stage 2. The solution set is shown in FIG. 6E.

Many of the rules in the solution set cover the same set of positive samples. As such, the rule generation system 210 uses a greedy approach to find the minimum subset of rules covering all the positive samples. This final rule list is shown in FIG. 6F.

Figure 7:
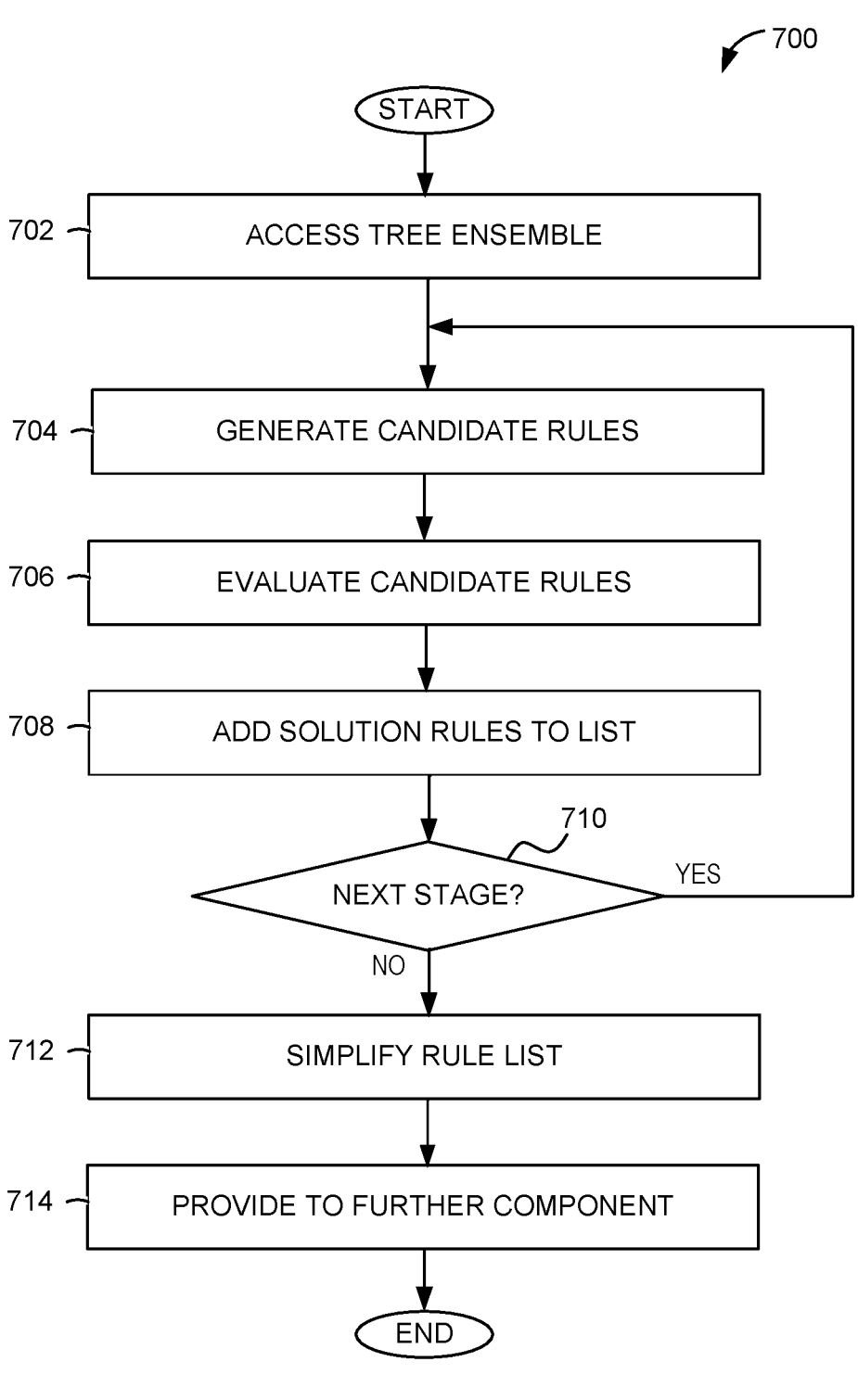
FIG. 7 is a flowchart illustrating operations of a method for generating a rule list from tree ensemble models, according to some example embodiments.

FIG. 7 is a flowchart illustrating operations of a method 700 for generating a rule list from tree ensemble models, according to some example embodiments. Operations in the method 700 may be performed by the networking server 118 of the network system 102, using components described above with respect to FIGS. 2 and 4. Accordingly, the method 700 is described by way of example with reference to the networking server 118. However, it shall be appreciated that at least some of the operations of the method 700 may be deployed on various other hardware configurations or be performed by similar components residing elsewhere in the network environment 100. Therefore, the method 700 is not intended to be limited to the networking server 118.

In operation 702, the model access module 402 accesses the tree ensemble that will be analyzed. In some embodiments, the tree ensemble may be accessed from the data storage(s) 122. In some embodiments, the tree ensemble may be accessed from the training system 208 that trained the tree ensemble.

In operation 704, the candidate rule generator 404 generates or extracts candidate rules from the tree ensemble. In a first stage, the candidate rule can be a conjunction of all feature splits from a root to a selected node within a tree. Thus, during a first stage for candidate rule generation (stage 1), the rules are extracted from individual trees of the tree ensemble by taking a conjunction of the decisions along a path from a root to each node.

In operation 706, the evaluation module 406 evaluates the candidate rules. The evaluation module 406 determines if a fraction of predicted positives among data that satisfies the candidate rule being considered exceeds a precision threshold (e.g., how many data samples 410 satisfy the candidate rule). If the candidate rule is below the threshold, the candidate rule is not considered. However, if the rule precision condition is true, the candidate rule is added to a solution set in operation 708.

In operation 710, a determination is made if another rule generation stage needs to be performed. A further stage is needed if, for example, the data samples are not satisfied within a precision threshold and a current stage number is less than the number of trees in the tree ensemble. If another rule generation stage is needed, then the method 700 returns to operation 704 where a next stage of candidate rules are generated. Thus, during a second loop, stage 2 rule candidates (i.e., candidates formed by merging rules corresponding to two nodes from stage 1 candidates) are generated. This is followed by evaluating stage 2 candidates in operation 706. The operations (704-708) are repeated for stage 3 to stage K, where K may equal the number of trees in the tree ensemble. At each stage, the candidate rules get larger (e.g., more clauses) and some of the candidate rules are added to the solution set.

If no further rule generation stages are needed, then the method 700 proceeds to operation 712 where the rule list generator 408 simplifies the solution set to obtain a simplified rule list. The rule list generator 408 simplifies the rule list by finding a minimum subset of rules from the solution set that covers all the positives covered by the rule list.

In operation 714, the rule list is provided to a further component or system associated with the networking server 118 for use. In some embodiments, the further component can search the rule list for at least one rule associated with an operation performed by the networking server 118 and causing presentation of the at least one rule to the client device 106 of a user. In one embodiment, the rule list indicates why the models triggered certain operations (e.g., identify an account as fake or taken over; determine particular recommendations for a user (e.g., job recommendation, connection recommendations)). In some cases, the system provides an option to receive a query from a reviewer that wants to understand why the model performed the operation and presents data derived from the rule list (e.g., the features or clauses associated with a corresponding rule). The reviewer can be a human reviewer, a machine reviewer (e.g., a chatbot), or a combination thereof.

For example, a selected rule is $f_1=1 \wedge f_2=1$, where $f_1$ is an indicator if a title of a job post matches a title of the member and $f_2$ is an indicator if a skill required by the job post is a skill in the skill list of the member. Thus, the rule in plain language could be stated as "the job post was selected as a match for the member because the title of the job post matches a title of the member and a skill required by the job post matches a skill of the member."

In another embodiment, the rule list may be provided to a model development component/system. Model developers may need to have some understanding of why models made particular decisions in order to inspect the models and determine if the models are in line with design choices (e.g., which features did a model use and why; are the features being used in the same way that the AI modeler thought it should be used). In some cases, if the model performs an action that is different from what the AI modeler had in mind when building the model, the resulting operation can cause customer complaints. Thus, the model developer may want to reference the rule list in these situations. The model developers can be human developers, machine developers (e.g., an AI modeling system), or a combination thereof.

In a further embodiment, the rule list is stored to a data storage and used in subsequent components/systems. Typically, older data and older rules may get lost when new models are trained. For instance, fake account models may be trained with data for a set of current attacks by which people are crafting these fake accounts. The new attacks are learned, but the old attacks can be forgotten, and it is assumed that the old attacks will not return. By having transparency into the older models, there is knowledge of all the reasons why fake accounts were blocked in the past when you train a new model. Thus, as new models are launched, the old rules are still kept and used.

In a final embodiment, when recommendations are provided to users, the reasons why the users were shown the recommendations can be provided. Thus, the rule list can be provided to a recommendation engine 206 of the networking server 118. The recommendation engine 206 can then present reasons why a particular recommendation was made by referencing the rule list and displaying data derived from the rule list (e.g., the features or clauses associated with a corresponding rule that resulted in the recommendation). The recommendations can include member recommendations, follow recommendations, job recommendations, company recommendations, hashtag recommendations, and so forth.

Figure 8:
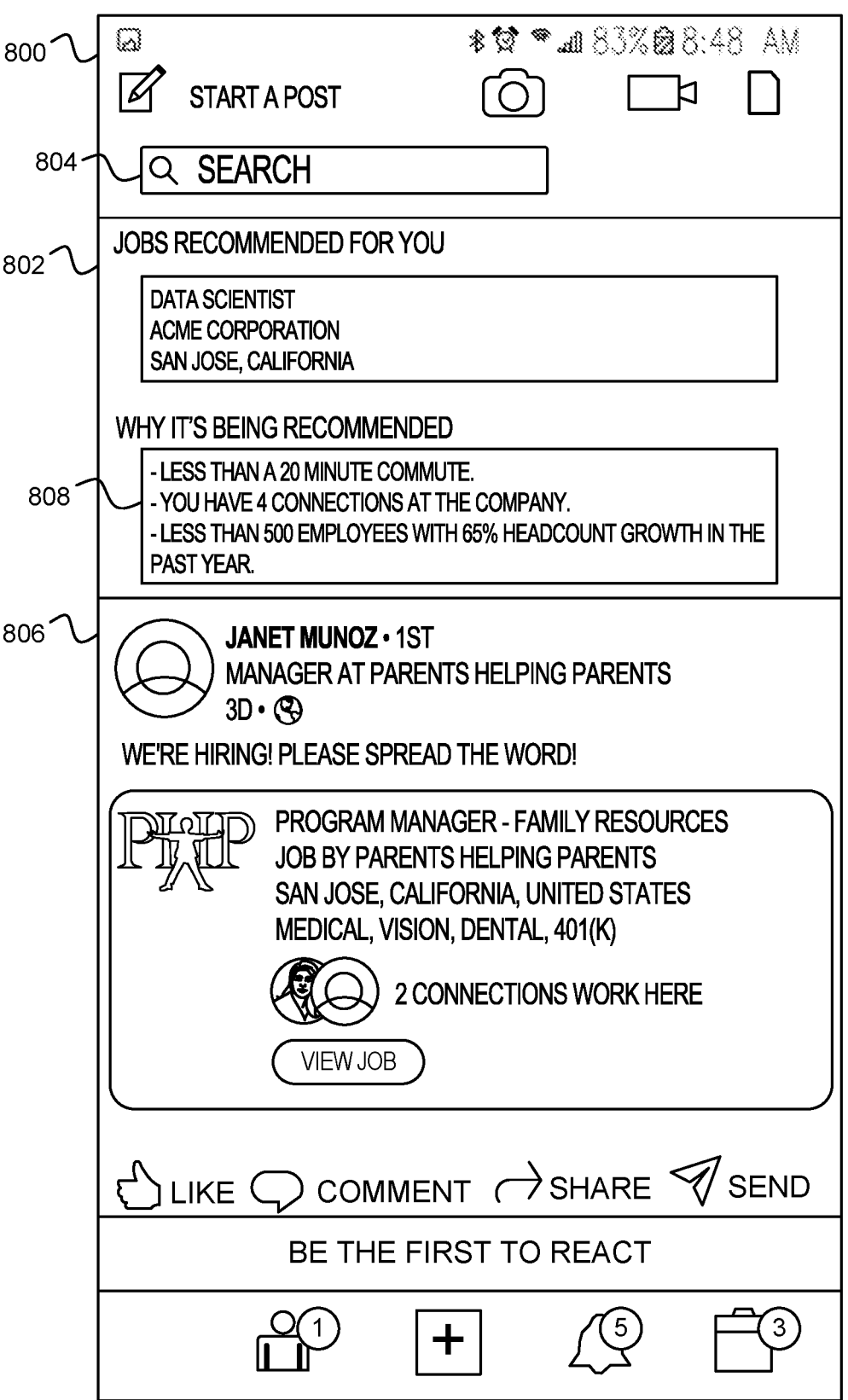
FIG. 8 illustrates a screenshot of a member feed that includes a job recommendation, according to an example embodiment.

As an example and referring to FIG. 8, a sample screenshot of a member feed 800 that includes a job recommendation 802 is shown. The member feed 800 may include items in different categories, such as a search field 804, the job recommendations 802, a job post 806, sponsored items, shortcuts, news, messages, articles, and so forth. In one example embodiment, a network service user interface provides the job recommendations 802 that match job interests of a member and that are presented without a specific job search request from the member, referred to herein as "jobs you may be interested in" (JYMBII). With the job recommendation 802, reasons why the job is being recommended can be included in a recommendation feature portion 808. The features indicated in the recommendation feature portion 808 are obtained from the rule list (e.g., a rule list generated by a job recommendation tree ensemble). In this example, the conditions from the tree ensemble include "commute for the member is less than thirty minutes," "member has at least one connection at the company offering the job," and "company has less than 500 employees." The details presented can be further tailored to the facts of the job recommendation. Thus, although the condition was for having at least one connection at the company, the member feed will present the actual number of connections instead of stating that there is at least one connection at the company. Further, the commute time is adjusted to less than twenty minutes instead of less than thirty minutes. Further yet, other values may be added, such as additional information about the company offering the job, such as the headcount growth in the past year.

In another example embodiment, the member feed 800 includes suggestions or recommendations (not shown) for adding new connections (e.g., People You May Know (PYMK)). Similar to the job recommendation, the connection recommendation can include a recommendation feature portion that indicates reasons (e.g., features) why the connection recommendation was made, whereby the features are obtained from a rule list generated from a connection recommendation tree ensemble.

Similar recommendation feature portions can be provided for other recommendations presented by the networking server 118 such as hashtag recommendations, follow recommendations, company recommendations, and so forth. Each of these recommendation feature portions can include features identified from a corresponding rule list generated from a corresponding tree ensemble.

Figure 9:
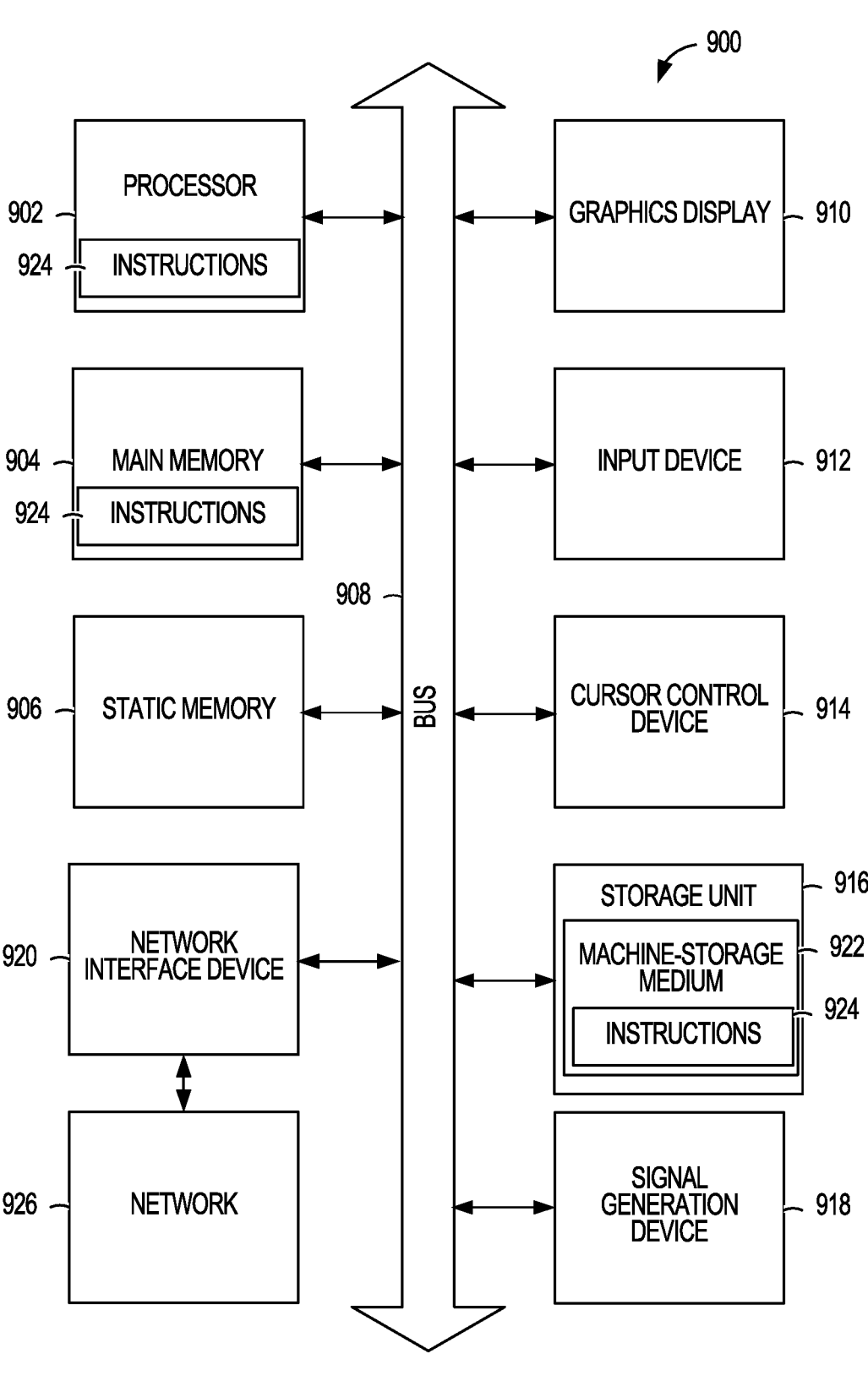
FIG. 9 is a block diagram illustrating components of a machine, according to some example embodiments, able to read instructions from a machine-storage medium and perform any of the methodologies discussed herein.

FIG. 9 illustrates components of a machine 900, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the block and flow diagram of FIG. 7. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-storage medium 922 (e.g., a tangible machine-storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered as machine-readable media (e.g., tangible and non-transitory machine-readable media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for extracting rule lists from tree ensembles. The method comprises extracting, by a rule generator of a server, first stage candidate rules from individual trees of a tree ensemble comprising a plurality of trees associated with a data set; identifying, by an evaluation module of the server, first stage candidate rules that satisfy a precision threshold, the first stage candidate rules that satisfy the precision threshold being placed in a solution set and pruned for further consideration; determining whether a further stage is needed based on whether a predetermined number of positive data samples of the data set are covered by the solution set; based on a determination that further stages are needed, perform operations comprising: generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

In example 2, the subject matter of example 1 can optionally include repeating the generating of the next stage candidate rules and the identifying the next stage candidate rules that satisfy the precision threshold until the predetermined number of positive data samples are covered by the solution set.

In example 3, the subject matter of any of examples 1-2 can optionally include wherein the generating the next stage candidate rules comprises taking pairs of previous stage candidate rules that have not been pruned and taking a conjunction rule for each pair.

In example 4, the subject matter of any of examples 1-3 can optionally include, at each stage, pruning candidate rules that have no support in the data set, the pruned candidate rules not being considered in subsequent stages.

In example 5, the subject matter of any of examples 1-4 can optionally include wherein the identifying the next stage candidate rules that satisfy the precision threshold comprises determining a total score for each next stage candidate rule by calculating a precision score based on a fraction of positives in the data set that satisfy the next stage candidate rule; and determining if the total score satisfies the precision threshold.

In example 6, the subject matter of any of examples 1-5 can optionally include receiving a selection to change the precision threshold, a lower precision threshold resulting in less processing time for generating the rule list.

In example 7, the subject matter of any of examples 1-6 can optionally include wherein the data samples comprise training data used to train the tree ensemble.

In example 8, the subject matter of any of examples 1-7 can optionally include providing the simplified rule list to a further component of the server, the further component searching the rule list for at least one rule associated with an operation performed by the server and causing presentation of data derived from the at least one rule to a device of a user.

In example 9, the subject matter of any of examples 1-8 can optionally include wherein the causing presentation of the data comprises causing display of a recommendation feature portion that includes features indicating why a recommendation was made based on the at least one rule.

In example 10, the subject matter of any of examples 1-9 can optionally include pruning, from consideration in subsequent stages, candidate rules that satisfy the precision threshold.

Example 11 is a system for extracting rule lists from tree ensembles. The system includes one or more hardware processors and a memory storing instructions that, when executed by the one or more hardware processors, causes the one or more hardware processors to perform operations comprising extracting, by a rule generator of a server, first stage candidate rules from individual trees of a tree ensemble comprising a plurality of trees associated with a data set; identifying, by an evaluation module of the server, first stage candidate rules that satisfy a precision threshold, the first stage candidate rules that satisfy the precision threshold being placed in a solution set and pruned for further consideration; determining whether a further stage is needed based on whether a predetermined number of positive data samples of the data set are covered by the solution set; based on a determination that further stages are needed, perform operations comprising: generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

In example 12, the subject matter of example 11 can optionally include wherein the operations further comprise based on a determination that a further stage is needed, repeating the generating of the next stage candidate rules and the identifying the next stage candidate rules that satisfy the precision threshold until the predetermined number of positive data samples are covered by the solution set.

In example 13, the subject matter of example 11-12 can optionally include wherein the generating the next stage candidate rules comprises taking pairs of previous stage candidate rules that have not been pruned and taking a conjunction rule for each pair.

In example 14, the subject matter of example 11-13 can optionally include wherein the operations further comprise, at each stage, pruning candidate rules that have no support in the data set, the pruned candidate rules not being considered in subsequent stages.

In example 15, the subject matter of any of examples 11-14 can optionally include wherein the identifying the next stage candidate rules that satisfy the precision threshold comprises determining a total score for each next stage candidate rule by calculating a precision score based on a fraction of positives in the data set that satisfy the next stage candidate rule; and determining if the total score satisfies the precision threshold.

In example 16, the subject matter of any of examples 11-15 can optionally include wherein the operations further comprise receiving a selection to change the precision threshold, a lower precision threshold resulting in less processing time for generating the rule list.

In example 17, the subject matter of any of examples 11-16 can optionally include wherein the operations further comprise providing the simplified rule list to a further component of the server, the further component searching the rule list for at least one rule associated with an operation performed by the server and causing presentation of data derived from the at least one rule to a device of a user.

In example 18, the subject matter of any of examples 11-17 can optionally include wherein the causing presentation of the data comprises causing display of a recommendation feature portion that includes features indicating why a recommendation was made based on the at least one rule.

In example 19, the subject matter of any of examples 11-18 can optionally include wherein the operations further comprise pruning, from consideration in subsequent stages, candidate rules that satisfy the precision threshold.

Example 20 is a machine-storage medium storing instructions that, when executed by at least one hardware processor of a machine, cause the machine to perform operations comprising extracting, by a rule generator of a server, first stage candidate rules from individual trees of a tree ensemble comprising a plurality of trees associated with a data set; identifying, by an evaluation module of the server, first stage candidate rules that satisfy a precision threshold, the first stage candidate rules that satisfy the precision threshold being placed in a solution set and pruned for further consideration; determining whether a further stage is needed based on whether a predetermined number of positive data samples of the data set are covered by the solution set; based on a determination that further stages are needed, perform operations comprising: generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

extracting, by a rule generator of a server, first stage candidate rules from individual trees of a tree ensemble comprising a plurality of trees associated with a data set;

identifying, by an evaluation module of the server, first stage candidate rules that satisfy a precision threshold, the first stage candidate rules that satisfy the precision threshold being placed in a solution set and pruned for further consideration;

determining whether a further stage is needed based on whether a predetermined number of positive data samples of the data set are covered by the solution set;

based on a determination that further stages are needed, perform operations comprising:

generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

2. The method of claim 1, further comprising:

repeating the generating of the next stage candidate rules and the identifying the next stage candidate rules that satisfy the precision threshold until the predetermined number of positive data samples are covered by the solution set.

3. The method of claim 1, wherein the generating the next stage candidate rules comprises taking pairs of previous stage candidate rules that have not been pruned and taking a conjunction rule for each pair.

4. The method of claim 1, further comprising:

after each stage, pruning candidate rules that have no support in the data set, the pruned candidate rules not being considered in subsequent stages.

5. The method of claim 1, wherein the identifying the next stage candidate rules that satisfy the precision threshold comprises:

determining a total score for each next stage candidate rule by calculating a precision score based on a fraction of positives in the data set that satisfy the next stage candidate rule; and determining if the total score satisfies the precision threshold.

6. The method of claim 1, further comprising:

receiving a selection to change the precision threshold, a lower precision threshold resulting in less processing time for generating the rule list.

7. The method of claim 1, wherein the data samples comprise training data used to train the tree ensemble.

8. The method of claim 1, further comprising:

providing the simplified rule list to a further component of the server, the further component searching the rule list for at least one rule associated with an operation performed by the server and causing presentation of data derived from the at least one rule to a device of a user.

9. The method of claim 8, wherein the causing presentation of the data comprises causing display of a recommendation feature portion that includes features indicating why a recommendation was made based on the at least one rule.

10. The method of claim 1, further comprising:

pruning, from consideration in subsequent stages, candidate rules that satisfy the precision threshold.

11. A system comprising:

one or more hardware processors; and a memory storing instructions that, when executed by the one or more hardware processors, cause the one or more hardware processors to perform operations comprising:

extracting, by a rule generator of a server, first stage candidate rules from individual trees of a tree ensemble comprising a plurality of trees associated with a data set;

identifying, by an evaluation module of the server, first stage candidate rules that satisfy a precision threshold, the first stage candidate rules that satisfy the precision threshold being placed in a solution set and pruned for further consideration;

determining whether a further stage is needed based on whether a predetermined number of positive data samples of the data set are covered by the solution set;

based on a determination that further stages are needed, perform operations comprising:

generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

12. The system of claim 11, wherein the operations further comprise:

based on a determination that a further stage is needed, repeating the generating of the next stage candidate rules and the identifying the next stage candidate rules that satisfy the precision threshold until the predetermined number of positive data samples are covered by the solution set.

13. The system of claim 11, wherein the generating the next stage candidate rules comprises taking pairs of previous stage candidate rules that have not been pruned and taking a conjunction rule for each pair.

14. The system of claim 11, wherein the operations further comprise:

after each stage, pruning candidate rules that have no support in the data set, the pruned candidate rules not being considered in subsequent stages.

15. The system of claim 11, wherein the identifying the next stage candidate rules that satisfy the precision threshold comprises:

determining a total score for each next stage candidate rule by calculating a precision score based on a fraction of positives in the data set that satisfy the next stage candidate rule; and determining if the total score satisfies the precision threshold.

16. The system of claim 11, wherein the operations further comprise:

receiving a selection to change the precision threshold, a lower precision threshold resulting in less processing time for generating the rule list.

17. The system of claim 11, wherein the operations further comprise:

providing the simplified rule list to a further component of the server, the further component searching the rule list for at least one rule associated with an operation performed by the server and causing presentation of data derived from the at least one rule to a device of a user.

18. The system of claim 17, wherein the causing presentation of the data comprises causing display of a recommendation feature portion that includes features indicating why a recommendation was made based on the at least one rule.

19. The system of claim 11, wherein the operations further comprise:

pruning, from consideration in subsequent stages, candidate rules that satisfy the precision threshold.

20. A machine-storage medium storing instructions that, when executed by at least one hardware processor of a machine, cause the machine to perform operations comprising:

extracting, by a rule generator of a server, first stage candidate rules from individual trees of a tree ensemble comprising a plurality of trees associated with a data set;

identifying, by an evaluation module of the server, first stage candidate rules that satisfy a precision threshold, the first stage candidate rules that satisfy the precision threshold being placed in a solution set and pruned for further consideration;

determining whether a further stage is needed based on whether a predetermined number of positive data samples of the data set are covered by the solution set;

based on a determination that further stages are needed, perform operations comprising:

generating, by the rule generator, next stage candidate rules from previous stage candidate rules that have not been pruned; and identifying, by the evaluation module, the next stage candidate rules that satisfy the precision threshold, the next stage candidate rules that satisfy the precision threshold being placed in the solution set and pruned for further consideration; and generating, by a list generator of the server, a simplified rule list by identifying a minimum subset of rules in the solution set that covers the positive data samples of the data set within the precision threshold.

* * * * *